(12) United States Patent
Kamio et al.

(10) Patent No.: US 7,290,505 B2
(45) Date of Patent: Nov. 6, 2007

(54) INTERNAL COMBUSTION ENGINE SYSTEM

(75) Inventors: Junichi Kamio, Wako (JP); Kohei Kuzuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/498,192

(22) Filed: Aug. 3, 2006

(65) Prior Publication Data

US 2007/0028861 A1   Feb. 8, 2007

(30) Foreign Application Priority Data

Aug. 4, 2005   (JP) .............................. 2005-226889

(51) Int. Cl.
  *F02B 1/12* (2006.01)
(52) U.S. Cl. .................. 123/1 A; 123/3; 123/25 C
(58) Field of Classification Search .............. 123/1 A, 123/3, 25 C, 25 E
  See application file for complete search history.

(56) References Cited

U.S. PATENT DOCUMENTS

| | | | | |
|---|---|---|---|---|
| 4,170,200 | A * | 10/1979 | Takeuchi et al. ................ | 123/3 |
| 4,413,594 | A * | 11/1983 | Hirota ............................. | 123/3 |
| 4,876,989 | A * | 10/1989 | Karpuk et al. .................. | 123/3 |
| 6,725,653 | B2 * | 4/2004 | Brown et al. ................... | 60/297 |
| 6,827,750 | B2 * | 12/2004 | Drozd et al. .................... | 44/629 |
| 6,860,241 | B2 * | 3/2005 | Martin et al. ................ | 123/1 A |
| 2002/0157619 | A1 * | 10/2002 | Gray ............................ | 123/1 A |
| 2004/0261763 | A1 * | 12/2004 | Hashimoto et al. ......... | 123/304 |
| 2006/0272597 | A1 * | 12/2006 | Burrington et al. ......... | 123/1 A |

FOREIGN PATENT DOCUMENTS

| JP | 2000-213444 A | 8/2000 |
|---|---|---|
| JP | 2001-355471 A | 12/2001 |

* cited by examiner

*Primary Examiner*—Stephen K. Cronin
*Assistant Examiner*—Jason Benton
(74) *Attorney, Agent, or Firm*—Birch, Stewart, Kolasch & Birch, LLP

(57) ABSTRACT

The invention provides an internal combustion engine system that uses a blended fuel consisting of hydrocarbon and alcohol, and can efficiently operate relative to a wide range of required load. The internal combustion engine system includes: an internal combustion engine 1; a first separating means 2 for separating the blended fuel into an alcohol/water mixture 21 and liquid hydrocarbon 22; a reforming means 13 for reforming the alcohol/water mixture to an ether/water mixture; a second separating means 14 for separating the ether/water mixture into the ether and the water; and control means 16 that controls the ratios of the liquid hydrocarbon 22, the alcohol/water mixture 21, and the ether. The internal combustion engine 1 is a homogeneous charge compression ignition internal combustion engine. The internal combustion engine system further includes: a first injector 12a that supplies the liquid hydrocarbon 22; a second injector 12b that supplies the alcohol/water mixture 21; and a third injector 12c that supplies the ether. The control means 16 increases the alcohol/water mixture 21 with increasing required load, and increases the ether with decreasing required load.

11 Claims, 3 Drawing Sheets

INTERNAL COMBUSTION ENGINE SYSTEM

BACKGROUND OF THE INVENTION

1. Field of the Invention

The present invention relates to an internal combustion engine system that uses a blended fuel consisting of hydrocarbon and alcohol.

2. Description of the Related Art

In recent years, compression ignition internal combustion engines such as homogeneous charge compression ignition internal combustion engine shave been studied in order to increase gas mileage of an internal combustion engine and reduce emissions. The compression ignition internal combustion engine introduces oxygen-containing gas and fuel capable of compression self-ignition into a cylinder for compression and self-ignition.

However, the compression ignition internal combustion engine has a problem that control of ignition timing is difficult unlike an internal combustion engine of a spark ignition type, and an operable area with stability is narrow. More specifically, this problem is that using a fuel with high ignitability may easily cause knocking when a required load of the engine is increased, and using a fuel with low ignitability may easily cause misfire when the required load of the engine is reduced.

In order to solve the problem, a technique has been known of mixing a fuel with high ignitability and a fuel with low ignitability and supplying the mixed fuels to the engine (for example, see Japanese Patent Laid-Open No. 2001-355471). According to this technique, a mixing ratio between the fuels is adjusted according to a required load of a compression ignition internal combustion engine, thereby allowing a stable operation relative to a wide range of required load. In this technique, however, the fuel with high ignitability and the fuel with low ignitability need to be separately prepared and housed.

On the other hand, a technique has been also known of using a single fuel, and oxidizing part of the fuel when a required load of a compression ignition internal combustion engine is increased, thereby generating ignitability inhibiting substance (for example, see Japanese Patent Laid-Open No. 2000-213444). More specifically, this technique is to oxidize part of a hydrocarbon fuel such as gas oil to generate ignitability inhibiting substance such as formaldehyde. However, partial oxidation of hydrocarbon such as the gas oil to generate formaldehyde requires a long-time reaction at high temperature.

As a fuel of an internal combustion engine, a blended fuel consisting of hydrocarbon and alcohol has been studied. When ethanol is used as the alcohol, the blended fuel can obtain a so-called carbon neutral effect by ethanol, thereby contributing to a reduction in an emission amount of carbon dioxide. The carbon neutral effect means that plants that are raw materials of ethanol absorb carbon dioxide through photosynthesis in its growing process, and thus burning ethanol to generate carbon dioxide is not considered to emit additional carbon dioxide as a whole.

However, when the blended fuel is supplied to a cylinder as a single fuel like gasoline and ignited by spark ignition, a sufficiently high efficiency cannot be obtained.

SUMMARY OF THE INVENTION

The present invention has an object to provide an internal combustion engine system that solves the above described problems, uses a blended fuel consisting of hydrocarbon and alcohol, and can efficiently operates relative to a wide range of required load.

In order to achieve the object, an internal combustion engine system according to the present invention comprises: an internal combustion engine; a first separating means for mixing water with a blended fuel consisting of liquid hydrocarbon and alcohol to separate into an alcohol/water mixture consisting of the water and the alcohol mixed and the liquid hydrocarbon; a reforming means for catalyzing at least part of the alcohol/water mixture to reform the alcohol/water mixture to an ether/water mixture; a second separating means for separating the ether/water mixture into the ether and the water; and a control means for controlling the ratios of the liquid hydrocarbon, the alcohol/water mixture, and the ether to the total fuel according to a required load of the internal combustion engine when the liquid hydrocarbon, the alcohol/water mixture, and the ether are supplied to the internal combustion engine as fuels.

In the internal combustion engine system according to the present invention, first, water is mixed with the blended fuel consisting of the liquid hydrocarbon and the alcohol by the first separating means. Between the liquid hydrocarbon and the alcohol that constitute the blended fuel, the alcohol is soluble in water, while the liquid hydrocarbon is insoluble in water. Thus, when water is mixed with the blended fuel, the alcohol is mixed with water to form the alcohol/water mixture, while the liquid hydrocarbon is easily separated from the alcohol/water mixture.

Then, at least part of the alcohol/water mixture is supplied to the reforming means. The reforming means catalyzes the alcohol/water mixture to dehydrate and condense the alcohol, and generate dialkylether corresponding to the alcohol. Thus, the reforming means modifies the supplied alcohol/water mixture to an ether/water mixture.

Next, the ether/water mixture is supplied to the second separating means. The ether is insoluble in water, and thus the ether/water mixture is easily separated into ether and water by the second separating means. Thus, the single blended fuel is easily separated into three kinds of fuels of the liquid hydrocarbon, the alcohol/water mixture, and the ether.

The liquid hydrocarbon, the alcohol/water mixture, and the ether are supplied to the internal combustion engine as the fuels. At this time, in the internal combustion engine system of the present invention, the control means controls the ratios of the fuels to the total fuel according to the required load of the internal combustion engine. The alcohol/water mixture has lower ignitability than the liquid hydrocarbon, and the ether has higher ignitability than the liquid hydrocarbon.

Thus, according to the internal combustion engine system of the present invention, the ratios of the fuels to the total fuel are controlled according to the required load of the internal combustion engine, thereby allowing an efficient operation relative to a wide range of required load.

In the internal combustion engine system of the present invention, the internal combustion engine may be an internal combustion engine of a spark ignition type that provides a spark to a fuel supplied into a cylinder for ignition, but is preferably a compression ignition internal combustion engine that compresses a fuel supplied into a cylinder for self ignition. According to the internal combustion engine system of the present invention, the control means may control the fuels to be supplied to the internal combustion engine so that the three kinds of fuels of the liquid hydrocarbon, the alcohol/water mixture, and the ether have desired compositions. Thus, the fuels always having preferred compositions can be supplied relative to the required load of the compression ignition internal combustion engine, and the compression ignition internal combustion engine can be operated with high efficiency.

The internal combustion engine system according to the present invention comprises: a first injector that injects and supplies the liquid hydrocarbon to the internal combustion engine; a second injector that injects and supplies the alcohol/water mixture to the internal combustion engine; and a third injector that injects and supplies the ether to the internal combustion engine, and injection amounts of the injectors are preferably controlled by the control means. According to the internal combustion engine system of the present invention having this configuration, the control means may easily control the ratios of the fuels to the total fuel.

In the internal combustion engine system of the present invention, the control means controls the ratios of the fuels to the total fuel so as to increase the ratio of the alcohol/water mixture to the total fuel with increasing required load, and increase the ratio of the ether to the total fuel with decreasing required load.

DETAILED DESCRIPTION OF THE PREFERRED EMBODIMENTS

Now, an embodiment of the present invention will be described in more detail with reference to the accompanying drawings.

Figure 1:
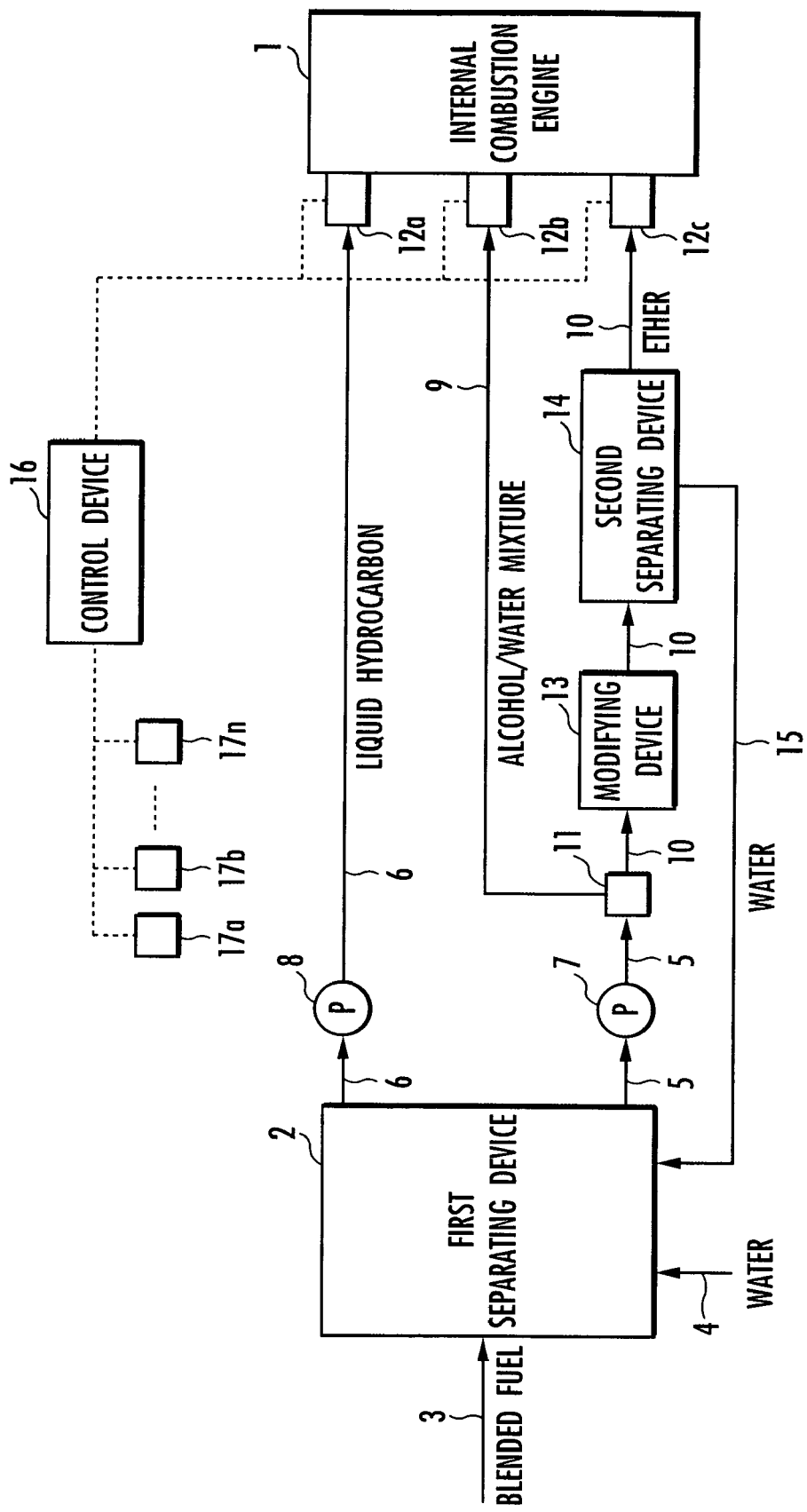
FIG. 1 is a system configuration diagram showing an exemplary configuration of an internal combustion engine system according to the present invention.

As shown in FIG. 1, an internal combustion engine system according to the embodiment comprises an internal combustion engine 1, and a first separating device 2 that mixes water with a blended fuel consisting of liquid hydrocarbon and alcohol to separate into an alcohol/water mixture and the liquid hydrocarbon. The first separating device 2 comprises a first conduit 3 that introduces the blended fuel from an unshown fuel tank, a first water conduit 4 that introduces water to be mixed with the blended fuel, a second conduit 5 that draws the separated alcohol/water mixture, and a third conduit 6 that draws the separated liquid hydrocarbon.

The second conduit 5 is connected to a distributing device 8 via a pump 7, and a fourth conduit 9 and a fifth conduit 10 branch off from the distributing device 8. The third conduit 6 is connected to a first injector 12a provided in the internal combustion engine 1 via a pump 11, and the liquid hydrocarbon separated by the first separating device 2 is supplied to the first injector 12a through the third conduit 6.

The fourth conduit 9 branching off from the distributing device 8 is connected to a second injector 12b provided in the internal combustion engine 1, and the alcohol/water mixture separated by the first separating device 2 is supplied to the second injector 12b through the second conduit 5 and the fourth conduit 9.

The fifth conduit 10 is connected to a third injector 12c provided in the internal combustion engine 1 via a reforming device 13 and a second separating device 14 provided therebetween. The reforming device 13 catalyzes the alcohol/water mixture supplied through the fifth conduit 10 and modifies the alcohol/water mixture to an ether/water mixture, and the second separating device 14 separates the ether/water mixture supplied from the reforming device 13 into ether and water. The ether separated by the second separating device 14 is supplied to the third injector 12c through the fifth conduit 10. On the other hand, the second separating device 13 comprises a second water conduit 15 connected to the first separating device 2, and the water separated by the second separating device 14 is returned to the first separating device 2 through the second water conduit 15.

Further, the internal combustion engine system according to the embodiment comprises a control device 16 that controls injection amounts of the injectors 12a, 12b and 12c, and the control device 16 is connected to operation state amount sensors 17a, 17b, . . . , 17n that detect various amounts relating to an operation state of the internal combustion engine 1.

Next, an operation of the internal combustion engine system according to the embodiment will be described.

In the internal combustion engine system according to the embodiment, first, the blended fuel consisting of liquid hydrocarbon and alcohol is introduced from an unshown fuel tank into the first separating device 2 through the first conduit 3. The liquid hydrocarbon includes, for example, gasoline or naphtha, and the alcohol includes, for example, ethanol. The blended fuel is mixed with water introduced from the first water conduit 4 and the second water conduit 15 in the first separating device 2.

The alcohol such as ethanol is soluble in water, while the liquid hydrocarbon such as gasoline or naphtha is insoluble in water. Thus, when water is mixed with the blended fuel, the alcohol is mixed with water to form an alcohol/water mixture, while the liquid hydrocarbon is easily separated from the alcohol/water mixture.

Figure 2:
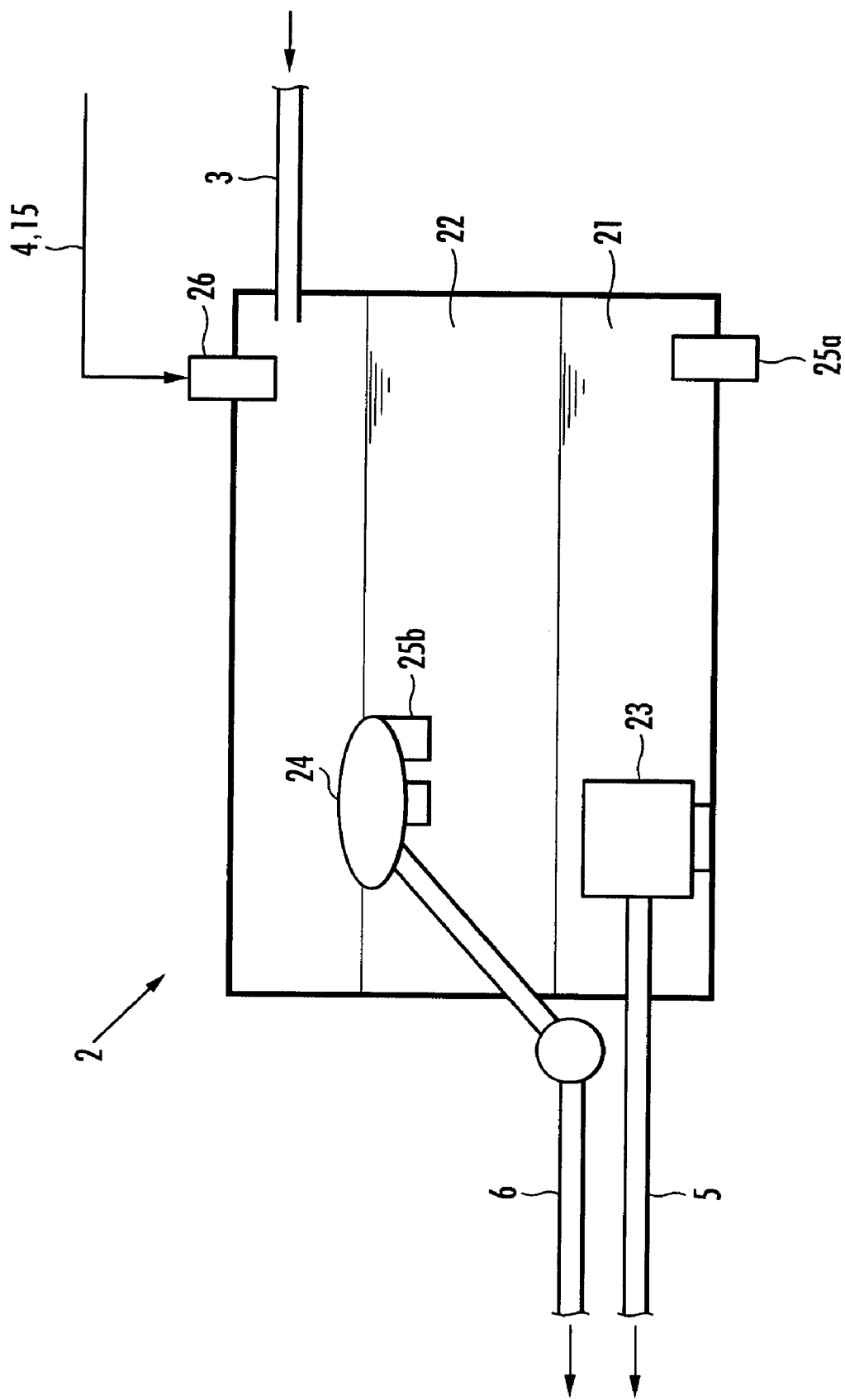
FIG. 2 is an illustrative sectional view of a configuration of a first separating device in FIG. 1.

The alcohol/water mixture and the liquid hydrocarbon have different specific gravities, and for example, when the hydrocarbon is gasoline or naphtha, the alcohol/water mixture containing water has a larger specific gravity. Thus, as shown in FIG. 2, the alcohol/water mixture 21 and the liquid hydrocarbon 22 are separated into two upper and lower layers by the action of gravity in the first separating device 2. In FIG. 2, the alcohol/water mixture 21 is in a lower layer, and the liquid hydrocarbon 22 is in an upper layer.

Thus, in the first separating device 2, an alcohol/water mixture drawing device 23 is provided at the bottom, to which the second conduit 5 is connected, and a liquid hydrocarbon drawing device 24 is provided so as to float on a liquid level of the liquid hydrocarbon 22 in the upper layer, to which the third conduit 6 is connected. In the first separating device 2, alcohol concentration sensors 25a and 25b are provided at the bottom and the liquid hydrocarbon drawing device 24 so that completion of separation of the alcohol/water mixture 21 and the liquid hydrocarbon 22 is detected from detection signals of the alcohol concentration sensors 25a and 25b. The alcohol/water mixture drawing device 23 and the liquid hydrocarbon drawing device 24 start drawing the alcohol/water mixture 21 and the liquid hydrocarbon 22, respectively, after the completion of separation of the alcohol/water mixture 21 and the liquid hydrocarbon 22 is detected.

In the first separating device 2, the first conduit 3, the first water conduit 4, and the second water conduit 15 are connected to an upper portion, and the first water conduit 4 and the second water conduit 15 supply a required amount of water to the first separating device 2 with a control valve 26.

Then, the liquid hydrocarbon 22 separated by the first separating device 2 is supplied to the first injector 12*a* through the third conduit 6 as shown in FIG. 1.

The alcohol/water mixture 21 separated by the first separating device 2 is fed to the distributing device 8 through the second conduit 5. The distributing device 8 distributes the alcohol/water mixture 21 supplied through the second conduit 5 into the fourth conduit 9 and the fifth conduit 10 in a predetermined amount. The alcohol/water mixture 21 distributed into the fourth conduit 9 by the distributing device 8 is supplied to the second injector 12*b* through the fourth conduit 9.

On the other hand, the alcohol/water mixture 21 distributed into the fifth conduit 10 by the distributing device 8 is then supplied to the reforming device 13. For example, as shown in FIG. 3, the reforming device 13 comprises a catalyst device 31 that is provided in the middle of the fifth conduit 10 and into which the alcohol/water mixture 21 is introduced, and a heating device 32 that heats the catalyst device 31.

Figure 3:
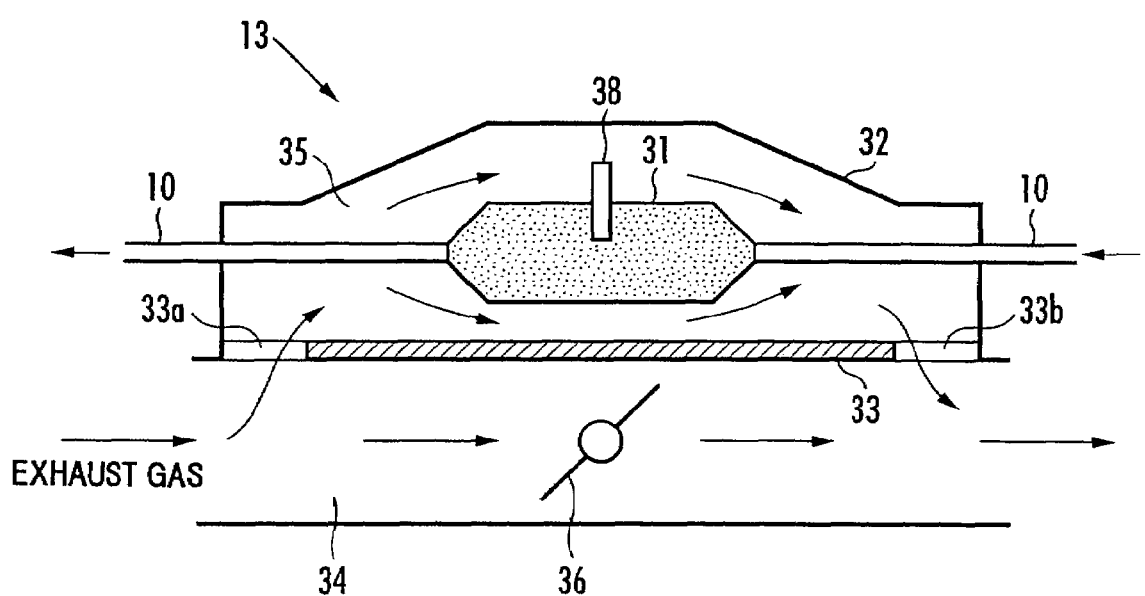
FIG. 3 is an illustrative sectional view of a configuration of a reforming device in FIG. 1.

The heating device 32 shown in FIG. 3 is configured by providing, around the catalyst device 31, an exhaust passage 35 adjacent to an exhaust pipe 34 of the internal combustion engine 1 via a diaphragm 33, and heats the catalyst device 31 with exhaust gas passing through the exhaust passage 35 so as to oppose the alcohol/water mixture 21 introduced into the catalyst device 31. The exhaust passage 35 communicates with the exhaust pipe 34 via an exhaust inlet 33*a* and an exhaust outlet 33*b* provided in the diaphragm 33, and the amount of passing exhaust gas can be adjusted by the degree of opening of a control valve 36 provided in the exhaust pipe 34. The catalyst device 31 is charged with an acid catalyst such as activated alumina, heteropolyacid, zeolite, silica alumina, or sulfated zirconia, and heated to a proper temperature by adjusting the opening degree of the control valve 36 according to a temperature detected by a temperature sensor 37.

Thus, the alcohol/water mixture 21 supplied to the reforming device 13 is brought into contact with the acid catalyst charged in the catalyst device 31 at a predetermined temperature, and the action of the acid catalyst dehydrates and condenses the alcohol to generate ether corresponding to the alcohol. When the alcohol is ethanol, the ether is diethylether. Therefore, the alcohol/water mixture 21 is modified to an ether/water mixture by the reforming device 13.

Then, the ether/water mixture is fed to the second separating device 14 through the fifth conduit 10 as shown in FIG. 1. The ether and water are insoluble in each other and have different specific gravities. Thus, the ether and the water are easily separated into two upper and lower layers by the action of gravity in the second separating device 14.

Next, the ether separated by the second separating device 14 is supplied to the third injector 12*c* through the fifth conduit 10. The water separated by the second separating device 14 is returned to the first separating device 2 through the second water conduit 15.

In the internal combustion engine system of the embodiment, the liquid hydrocarbon 22, the alcohol/water mixture 21, and the ethanol thus separated are supplied from the injectors 12*a*, 12*b* and 12*c* to the internal combustion engine 1 as fuels. At this time, the control device 16 grasps an operation state of the internal combustion engine 1 from the detection signals of the operation state amount sensors 17*a*, 17*b*, . . . , 17*n* to control the amounts of the liquid hydrocarbon 22, the alcohol/water mixture 21, and the ethanol injected from the injectors 12*a*, 12*b* and 12*c*. The operation state amount sensors 17*a*, 17*b*, . . . , 17*n* detect operation state amounts such as the temperature, pressure, torque, or RPM of the internal combustion engine 1.

The above described configuration allows the control device 16 to easily change the ratios of the fuels of the liquid hydrocarbon 22, the alcohol/water mixture 21, and the ethanol to the total fuel. The control device 16 controls the ratios of the fuels of the liquid hydrocarbon 22, the alcohol/water mixture 21, and the ethanol to the total fuel so as to increase the ratio of the alcohol/water mixture 21 to the total fuel with increasing required load, and increase the ratio of the ether to the total fuel with decreasing required load.

Thus, in the internal combustion engine system according to the embodiment, the fuels having proper compositions are supplied according to the required load of the internal combustion engine 1 to efficiently operate the internal combustion engine 1.

Next, examples relating to the separation of the blended fuel consisting of liquid hydrocarbon and alcohol will be described.

EXAMPLE 1

In this example, first, gasoline containing 30% by volume of ethanol (E30 gasoline) as a blended fuel was supplied from the first conduit 3 to the first separating device 2, water in an amount of 3.5% by weight of the blended fuel was supplied from the first water conduit 4, and the blended fuel and the water were mixed. Thus, in the first separating device 2, an ethanol/water mixture as the alcohol/water mixture 21 and gasoline as the liquid hydrocarbon 22 were separated, and the gasoline and the ethanol/water mixture were obtained in upper and lower layers, respectively. The gasoline was about 63% by weight of the total amount, and the ethanol/water mixture was about 37% by weight of the total amount.

Then, part of the ethanol/water mixture drawn from the first separating device 2 was supplied to the reforming device 13 through the fifth conduit 10 at a flow rate of 10 kg/h. The catalyst device 31 in the reforming device 13 was charged with about 1 kg heteropolyacid as acid catalyst, and the opening degree of the control valve 36 was adjusted to heat the acid catalyst in the catalyst device 31 to about 210° C. Thus, the ethanol in the ethanol/water mixture was dehydrated and condensed to generate diethylether, and the ethanol/water mixture was modified to the ether/water mixture.

Then, the ether/water mixture was supplied to the second separating device 14 and separated into ether and water. Thus, diethylether and water was obtained of the ratio of 7:3 (weight ratio) relative to the total amount of the ethanol/water mixture supplied to the reforming device 13.

EXAMPLE 2

In this example, first, naphtha containing 50% by volume of ethanol (E50 naphtha) as a blended fuel was supplied from the first conduit 3 to the first separating device 2, water in an amount of 9% by weight of the blended fuel was supplied from the first water conduit 4, and the blended fuel and the water were mixed. Thus, in the first separating device 2, an ethanol/water mixture as the alcohol/water mixture 21 and naphtha as the liquid hydrocarbon 22 are separated, the naphtha and the ethanol/water mixture were obtained in upper and lower layers, respectively. The naphtha was about 37% by weight of the total amount, and the ethanol/water mixture was about 63% by weight of the total amount.

Then, part of the ethanol/water mixture drawn from the first separating device 2 was supplied to the reforming device 13 and modified to an ether/water mixture in completely the same manner as in Example 1, and the ether/water mixture was supplied to the second separating device 14 and separated into ether and water. Thus, about 80% by weight of diethylether and about 20% by weight of water were obtained relative to the total amount of the ethanol/water mixture supplied to the reforming device 13.

What is claimed is:

1. An internal combustion engine system comprising:
    an internal combustion engine;
    a first separating means for mixing water with a blended fuel consisting of liquid hydrocarbon and alcohol to separate into an alcohol/water mixture consisting of said water and said alcohol mixed and said liquid hydrocarbon;
    a reforming means for catalyzing at least part of said alcohol/water mixture to reform said alcohol/water mixture to an ether/water mixture;
    a second separating means for separating said ether/water mixture into said ether and said water; and
    a control means for controlling the ratios of said liquid hydrocarbon, said alcohol/water mixture, and said ether to the total fuel according to a required load of said internal combustion engine when said liquid hydrocarbon, said alcohol/water mixture, and said ether are supplied to said internal combustion engine as fuels.

2. The internal combustion engine system according to claim 1, wherein said internal combustion engine is a compression ignition internal combustion engine that compresses a fuel supplied into a cylinder for self ignition.

3. The internal combustion engine system according to claim 1, further comprising:
    a first injector that injects and supplies said liquid hydrocarbon to said internal combustion engine; a second injector that injects and supplies said alcohol/water mixture to said internal combustion engine; and a third injector that injects and supplies said ether to said internal combustion engine,
    wherein injection amounts of the injectors being controlled by said control means.

4. The internal combustion engine system according to claim 1, wherein said control means increases the ratio of said alcohol/water mixture to said total fuel with increasing required load, and increases the ratio of said ether to said total fuel with decreasing required load.

5. The internal combustion engine system according to claim 1, wherein said liquid hydrocarbon is gasoline or naphtha.

6. The internal combustion engine system according to claim 1, wherein said alcohol is ethanol.

7. The internal combustion engine system according to claim 1, wherein said ether is diethylether.

8. The internal combustion engine system according to claim 1, wherein said first separating means comprises:
    a separating device into which said blended fuel is introduced;
    blended fuel supplying means for supplying said blended fuel to said separating device;
    water supplying means for supplying water to said separating device;
    an alcohol concentration sensor that detects separation of said alcohol/water mixture and said liquid hydrocarbon when water is mixed with said blended fuel;
    wherein an alcohol/water mixture drawing conduit and a liquid hydrocarbon drawing conduit that independently draw said alcohol/water mixture and said liquid hydrocarbon, respectively, separated into two upper and lower layers.

9. The internal combustion engine system according to claim 1, wherein said reforming means comprises:
    a catalyst device into which the alcohol/water mixture is introduced; and
    a heating device that heats said catalyst device, and
    said heating device is provided around said catalyst device, and comprises an exhaust passage through which part of exhaust gas of the internal combustion engine passes.

10. The internal combustion engine system according to claim 1, wherein said catalyst is at least one kind of acid catalyst selected from the group consisting of activated alumina, heteropolyacid, zeolite, silica alumina, and sulfated zirconia.

11. The internal combustion engine system according to claim 1, wherein said catalyst is heteropolyacid.

* * * * *